United States Patent [19]
Shishido
[11] Patent Number: 4,613,508
[45] Date of Patent: Sep. 23, 1986

[54] PROCESS FOR PRODUCING FILLED HARD DOUGH BISCUITS

[75] Inventor: Toshihiko Shishido, Chigasaki, Japan
[73] Assignee: Morinaga & Co., Ltd., Tokyo, Japan

[21] Appl. No.: 548,759
[22] Filed: Nov. 4, 1983
[30] Foreign Application Priority Data
Nov. 9, 1982 [JP] Japan ................................ 57-196582
[51] Int. Cl.[4] ............................................ A21D 13/08
[52] U.S. Cl. ...................................... 426/281; 426/94; 426/102
[58] Field of Search ........... 426/94, 103, 102, 281-284

[56] References Cited

U.S. PATENT DOCUMENTS 3,538,840 11/1970 Nelson et al. ........................ 426/281
4,209,536 6/1980 Dogliotti ............................... 426/94

FOREIGN PATENT DOCUMENTS 1084764 9/1980 Canada ................................ 426/283

*Primary Examiner*—Raymond N. Jones
*Assistant Examiner*—Elizabeth A. King
*Attorney, Agent, or Firm*—Armstrong, Nikaido, Marmelstein & Kubovcik

[57] ABSTRACT

A hard dough biscuit expanded in a degree of expansion of at least 280 by baking and containing a non-dough filling as a core material injected therein after expansion and a process for production of same.

2 Claims, No Drawings

PROCESS FOR PRODUCING FILLED HARD DOUGH BISCUITS

BACKGROUND OF THE INVENTION (1) Field of the Invention:

This invention relates to a hard dough biscuit containing a filling therein and a production process of same.

(2) Description of the Prior Art:

As baked foods having fillings, there are known those produced by injecting fillings in puffs, pies and the like. Since all of these baked foods have soft textures and large cavities therein, the injection of fillings can be carried out with ease.

Other products have also been made by injecting fillings in sponge cakes, breads and the like. These products can also be made readily because such baked foods also have soft textures which are readily pushed aside near the points of filling injection and form cavities for receiving the fillings therein.

On the other hand, conventional hard dough biscuits have hard textures and contain a number of minute air bubbles uniformly and substantially in the form of layers. Besides, each conventional hard dough biscuit contains many pinholes made prior to its baking. Thus, it has been totally impossible to inject fillings in such prior art hard dough biscuits.

SUMMARY OF THE INVENTION

The present inventor has carried out an investigation with a view toward developing a method for injecting a filling in a hard dough biscuit having such a hard and dense texture as described above. As a result, it has been found that the injection of a filling becomes feasible when a hard dough biscuit is baked in a such a manner as to achieve at least certain percentage leavening, leading to completion of this invention. By the term "percentage leavening" as used herein, is meant a value expressed by the following equation:

$$\text{Percentage leavening} = \frac{\text{Volume after baking}}{\text{Volume before baking}} \times 100$$

Conventional hard dough biscuits were made by rolling a cereal dough into a sheet, alternately folding and rolling the sheet, cutting the resultant dough sheet into desired shapes, forming a number of pinholes therethrough and then baking them. Accordingly, their percentage leavenings did not exceed 250 normally. Namely, the prior art was able to provide only hard dough biscuits having such textures as described above.

When such a cereal dough sheet as described above was baked in such a manner as to give a percentage leavening in excess of 280, its appearance became roundish and its cavities became larger. The thus-produced hard dough biscuit was not liable to break up even when a hollow needle was pierced therein for injecting a filling. Moreover, the thus-injected filling was allowed to spread throughout the cavities of the hard dough biscuit, thereby providing a filling-containing product with ease.

A hard dough biscuit having a large percentage leavening and facilitating the injection of a filling therein is obtained by baking a cut-out cereal dough sheet without forming pinholes therethrough. The exclusion of such pinholes does not only permit the baked product to leaven to a considerable extent but also provide a biscuit surface bearing no holes therein, thereby providing a hard dough biscuit suitable for injecting a filling therein.

An object of this invention is to provide a hard dough biscuit having a percentage leavening of at least 280 and containing a filling therein.

Another object of this invention is to provide a process for producing a hard dough biscuit which has a percentage leavening of at least 280 and contains a filling therein.

In one aspect of this invention, there is thus provided a hard dough biscuit percentage leavening of at least 280 by baking, and containing a non-dough filling as a core material injected therein after expansion.

In another aspect of this invention, there is also provided a process for producing hard dough biscuits, each of which contains a non-dough filling such as chocolate, jam or the like therein, which process comprises:

preparing cereal dough pieces of desired shapes without pinholes;

baking the obtained pieces into hard dough biscuits having a percentage leavening of at least 280; and injecting the fillings in the biscuits.

The hard dough biscuits of this invention have never been available prior to the present invention and are of an absolutely new type, and permit to taste both hard dough biscuits and their fillings at the same time while still allowing to enjoy the light and crispy textures of the hard dough biscuits.

Conventional hard dough biscuits were able to imitate the shapes of animals, birds, fish and the like by their planar profiles only. When cereal dough sheets having the profiles of such animals, birds, fish and the like are baked in accordance with the process of this invention, they are leavened to considerable extents while maintaining shapes corresponding to their original planar profiles. Thus, the shapes of such animals, birds, fish and the like are shown three-dimensionally, thereby making the resultant hard dough biscuits very attractive.

When patterns corresponding to the appearance of such animals, birds, fish and the like, for example, eyes, mouths and the like or any other desired patterns are drawn by the printing technique or the like on one sides or both sides of such cereal dough sheets prior to their baking, patterns full of three-dimensional appearance can be applied on the surfaces of three-dimensionally leavened hard dough biscuits. Such patterns make the hard dough biscuits of this invention still more attractive.

The above and other objects, features and advantages of the present invention will become apparent from the following description and the appended claims.

DETAILED DESCRIPTION OF THE INVENTION AND PREFERRED EMBODIMENTS

Hard dough biscuits according to this invention may be produced in the following manner.

First of all, a cereal dough having a formula suitable for making hard dough biscuits is prepared. Namely, auxiliary raw materials such as sugars, oils and fats, milk, dairy products, eggs, common salt, flavors and/or seeds and nuts are added, as desired, to cereal flour, followed by an addition of water if needed. The thus-proportioned mixture is then mixed and kneaded into a dough-like mixture, in other words, into a cereal dough suitable for making the so-called hard dough biscuits. It is also feasible to add a leavening agent or to incorporate yeast so as to ferment the dough if necessary.

As exemplary flours useful for the practice of this invention, may be mentioned the so-called flours used in baked foods, including wheat flour and mixtures of wheat flour and other powdery farinaceous raw materials such as barley flour, rye flour, cornmeal, potato starch, corn starch and the like.

On the other hand, it is possible to use, as the sugars, one or more sugars selected suitably from sugars such as sucrose, maltose, lactose, glucose, fructose, xylose, corn syrup and isomerized sugar and reducing sugars such as sorbitol, maltitol, xylitol and reduced starch hydrolysates.

As the oils and fats, may be used butter, shortening, margarine, liquid oils, hardened oils, etc. as desired.

In the case of a cereal dough containing such auxiliary raw materials as sugars, oils and fats at low proportions relative to the cereal flour, the texture of the resultant baked product is hard and weak and the baked product involves a potential danger that it may be broken up when injecting a filling. Therefore, it is desirous to use a cereal dough containing such auxiliary raw materials at certain proportions.

If a cereal dough is prepared with excess sugar, for example, as a cereal dough prepared by kneading 40 parts by weight of sugar, 15 parts by weight of oil or fat and 17 parts by weight of water (overall) with 100 parts by weight of wheat flour, the resultant baked product will on the other hand be hard and weak and will give poor feeling to the eating.

Where a cereal dough is prepared with excess oil or fat, for example, as a cereal dough containing 25 parts by weight of sugar, 30 parts by weight of oil or fat and 16 parts by weight of water (overall) per 100 parts by weight of wheat flour, the resultant baked product will be crumblily bound and thus susceptible of breaking up, and the injection of a filling thereinto will be difficult. Moreover, the baked product will give some powdery feeling to the eating.

It may also be contemplated to lower the proportions of sugar and oil or fat and instead to increase the proportion of overall water, for example, to 30 parts by weight per 100 parts by weight of wheat flour in order to compensate the reduction of the former ingredients and to adjust the hardness of the cereal dough for ready handling. This will however result in a baked product which is also susceptible to breakage, thereby making the injection of a filling difficult.

Accordingly, it is not desirable to use a cereal dough containing auxiliary raw materials at low proportions, such as a cereal dough for soda crackers or cream crackers. It is recommendable to use a cereal dough containing auxiliary raw materials at certain proportions, for example, a cereal dough for snack-type crackers or general hard biscuits. However, it is not desirous to use a cereal dough containing too much auxiliary raw materials, such as a cereal dough for tart.

It is most preferable to use a cereal dough which comprises 10–30 parts by weight of a sugar, 10–25 parts by weight of an oil or fat and 35–20 parts by weight of overall water per 100 parts by weight of a cereal flour. When such a dough is used, the resulting baked product will not be hard but will not be susceptible of breaking up. A hollow needle may be readily pierced therein when injecting a filling. The baked product will thus be suitable for the mechanical injection of a filling.

By the way, the term "overall water" as used herein means the total amount of water, namely, the sum of water originated from such auxiliary raw materials other than the cereal flour as butter, margarine, milk, eggs, sugars and the like as well as the added water.

It is desirable to use a leavening agent to increase the percentage leavening. In order to ensure to achieve a percentage leavening of at least 280, it is desirable to use the leavening agent at a proportion higher than 1.5 wt. % which is the upper limit of a leavening agent for ordinary biscuits.

However, use of too much leavening agent develops cracks in the baked product or produces a weak and fragile texture. Thus, it is more desirable to add such a leavening agent in an amount of 2.0–4.0 wt. % based on the cereal dough.

Furthermore, it may also be desirable to add yeast in place of the leavening agent or in combination with the leavening agent so that the dough is fermented and its percentage leavening is increased further.

As the leavening agent, it is possible to use alkaline leavening agents, acidic leavening agents and baking powders, which are mixtures of such alkaline leavening agents and acidic leavening agents, singly or in combination.

The cereal dough is then rolled into a sheet. The sheet is alternately folded and rolled. The thus-prepared dough sheet is thereafter cut into desire,d shapes, providing shaped dough sheets bearing no pinholes. They are then baked into hard dough biscuits having a percentage leavening of at least 280.

Namely, in the case of conventional hard dough biscuits, a cereal dough was also rolled into a sheet, the resultant sheet was folded and rolled to prepare a dough sheet, and the dough sheet was then cut into desired shapes. Upon cutting the dough sheet into desired shapes or before or after the cutting of the dough sheet, a number of pinholes were formed through the dough sheet. In this invention, a sheet of a cereal dough is formed into desired shapes without forming pinholes therethrough after rolling the cereal dough into the sheet, thereby providing sheets free of pinholes.

It should however be borne in mind that the term "sheets free of pinholes" embraces sheets having certain areas where no pinholes are formed, for example, a sheet having a central part free of pinholes and a peripheral part bearing pinholes so that the sheet may be leavened at the central part to facilitate the injection of a filling therein, to say nothing of a dough sheet having no pinholes over the entire surface thereof.

The baking may be carried out in a usual manner, using an oven.

Thereafter, a filling is injected in the resultant baked and leavened hard dough biscuits.

As the non-dough filling, it is possible to use a material having fluidity upon its injection, for example, chocolate, fat cream, custard cream, whipped cream, ice cream, nuts paste, jam, jelley, or the like.

The injection of the non-dough filling may be carried out by piercing each hard dough biscuit with a hollow needle, for example, a syringe needle and injecting the filling under pressure.

The present invention will hereinafter be described in further detail by the following Examples.

EXAMPLE 1

In a manner known per se in the art, 100 parts by weight of wheat flour, 15 parts by weight of sucrose, 12 parts by weight of shortening, 25 parts by weight of water and 1.5 parts by weight of baking powder were mixed and kneaded into a cereal dough suitable for making hard dough biscuits. After rolling the cereal dough into a sheet, the sheet was punched out into shaped sheets having no pinholes. The shaped sheets were then baked by a method commonly known in the art to give hard dough biscuits. The percentage leavening of the hard dough biscuits was about 310.

Using an injector equipped with intermittent injection needles the diameters of which were individually 2 mm, the hard dough biscuits were automatically injected with chocolate. The chocolate was injected as a filling without forming cracks in the hard dough biscuits or breaking up the same. Thus, hard dough biscuits containing chocolate as their fillings were obtained.

They were very delicious because the hard dough biscuits, namely, the shells and the fillings, namely the chocolate were tasted at the same time.

EXAMPLE 2

Eighty parts by weight of wheat flour, 20 parts by weight of corn starch, 25 parts by weight of sucrose, 20 parts by weight of shortening, 23 parts by weight of water and 2.5 parts by weight of baking powder were processed in the same manner as in Example 1, thereby forming shaped sheets which were free of pinholes. They were then baked into hard dough biscuits. The percentage leavening of the hard dough biscuits was 350.

Then, chocolate cream was automatically injected as fillings into the hard dough biscuits by means of the same injector as used in Example 1. The fillings were injected without causing the hard dough biscuits to develop cracks or undergo breakage, thereby obtaining hard dough biscuits containing chocolate cream as their fillings.

The hard dough biscuits gave good feeling to the eating and were very delicious.

EXAMPLE 3

Ninety parts by weight of wheat flour, 10 parts by weight of rye flour, 28 parts by weight of sucrose, 18 parts by weight of margarine, 20 part by weight of water and 3.5 parts by weight of baking powder were mixed and kneaded into a cereal dough suitable for making hard dough biscuits. The cereal dough was then rolled and cut into shaped sheets having no pinholes. They were baked into hard dough biscuits. The percentage leavening of the hard dough biscuits was 320.

Then, fat cream was automatically injected into the above hard dough biscuits by means of the same injector as used in Example 1, thereby obtaining hard dough biscuits containing the fat cream as their fillings. When the fillings were injected, almost no hard dough biscuits were caused to develop cracks or were broken up.

The hard dough biscuits having the above-described fillings gave good feeling to the eating when they were bitten. Moreover, the hard dough biscuit and the filling, i.e., the fat cream were mixed together in the mouth, thereby giving especially good taste.

EXAMPLE 4

Mixed and kneaded were 100 parts by weight of wheat flour, 10 parts by weight of sucrose, 10 parts by weight of shortening, 30 parts by weight of water, 2.5 parts by weight of baking powder and 2 parts by weight of yeast. After allowing the resultant dough to undergo fermentation, the thus-fermented dough was rolled and cut into shaped sheets having no pinholes. They were then baked into hard dough biscuits. The percentage leavening of the hard dough biscuits was 400.

Then, the custard cream was automatically injected into the hard dough biscuits by means of the same injector as used in Example 1, thereby obtaining hard dough biscuits containing the custard cream as their fillings. Almost none of the hard dough biscuits were caused to develop cracks or were broken up when the fillings were injected.

The hard dough biscuits containing the fillings gave good feeling to the eating and were very delicious.

EXAMPLE 5

A cereal dough was prepared by mixing and kneading 100 parts by weight of wheat flour, 20 parts by weight of sucrose, 20 parts by weight of butter, 25 parts by weight of water and 3 parts by weight of baking powder. The cereal dough was then rolled into a sheet, which was then printed with pictures of animals, vehicles, crafts and vessels. The thus-printed dough sheet was thereafter punched out to form shaped sheets bearing such patterns but having no pinholes on and in their surfaces. They were then baked into hard dough biscuits presenting patterns full of three-dimensional feeling. The percentage leavening of the hard dough biscuits was 380.

Then, the hard dough biscuits were injected automatically with chocolate by means of the same injector as used in Example 1, thereby obtaining hard dough biscuits having fillings.

The resultant hard dough biscuits had joyful and attractive patterns on the surfaces thereof. Their taste was also very good.

EXAMPLE 6

A cereal dough was prepared by mixing and kneading 100 parts by weight of wheat flour, 10 parts by weight of sucrose, 10 parts by weight of margarine, 15 parts by weight of water and 1.5 parts by weight of baking powder. The cereal dough was then rolled and cut into shaped sheets having no pinholes. They were thereafter baked into hard dough biscuits. The percentage leavening of the hard dough biscuits was 290.

The hard dough biscuits were so weak and fragile that some of them were broken up when their fillings were mechanically injected by means of an automatic injector. Therefore, chocolate was injected manually into the hard dough biscuits to produce hard dough biscuits having fillings. They were very delicious.

EXAMPLE 7

A cereal dough, which had been prepared by mixing and kneading 80 parts by weight of wheat flour, 10 parts by weight of rye flour, 10 parts by weight of wheat starch, 35 parts by weight of sucrose, 28 parts by weight of butter, 15 parts by weight of milk and 4 parts by weight of baking powder, was rolled and cut into shaped sheets having no pinholes. They were then baked into hard dough biscuits. The percentage of the hard dough biscuits was 300.

Since the hard dough biscuits were crumblily bound and were susceptible of breaking up, they would have been broken up if their fillings had been injected automatically by means of an injector. Thus, they were injected with custard cream by hands to make hard dough biscuits containing the custard cream as their fillings.

When they were tasted, the taste of the filling and that of the biscuit were mixed to give very delicious combination of taste.

EXAMPLE 8

A fermented cereal dough was prepared by mixing and kneading 100 parts by weight of wheat flour, 1 part by weight of sucrose, 12 parts by weight of shortening, 20 parts by weight of water, 1 part by weight of baking powder and 2 parts by weight of yeast and then allowing the resultant dough to undergo fermentation. The fermented cereal dough was thereafter rolled and cut into shaped sheets having no pinholes. They were then baked into hard dough biscuits. The percentage leavening of the hard dough biscuits was 340.

The texture of each of the hard dough biscuits was formed of a hard shell and cavities. Thus, it was difficult to mechanically inject fillings therein by means of an automatic injector. After making a hole by a gimlet, an inject hollow needle was inserted to inject fat cream therein and a hard dough biscuit containing the fat cream as its filling was hence obtained. Its shell and filling gave well-matched taste, thereby making the hard dough biscuit very delicious.

Having now fully described the invention, it will be apparent to one of ordinary skill in the art that many changes and modifications can be made thereto without departing from the spirit or scope of the invention as set forth herein.

What is claimed is:

1. A process for producing hard dough biscuits, which comprises:

(a) preparing a cereal dough comprising 10–30 parts by weight of sugar, 10–25 parts by weight of edible fat or oil, 1.5–4.0% leavening agent, 20–35 parts by weight of water, and minor amounts of other materials, per 100 parts by weight of cereal flour;

(b) sheeting said dough by rolling, thereby providing sheets free of pin holes;

(c) forming said sheets into desired shapes;

(d) baking said shaped pieces into hard dough biscuits, whereby the percentage leavening, as expressed by the following equation:

$$\text{percentage leavening} = \frac{\text{volume after baking}}{\text{volume before baking}} \times 100$$

reaches at least 280; and (e) injecting a non-dough filling as a core material in the thus obtained biscuit by means of a hollow needle.

2. The process as claimed in claim 1, wherein the cereal dough contains 2.0–4.0 wt. % of the leavening agent.

* * * * *